United States Patent
Naganuma et al.

(10) Patent No.: US 12,383,929 B2
(45) Date of Patent: Aug. 12, 2025

(54) VEHICLE STRUCTURE

(71) Applicant: TOYOTA JIDOSHA KABUSHIKI KAISHA, Toyota (JP)

(72) Inventors: Yuki Naganuma, Nagoya (JP); Junya Ogawa, Okazaki (JP); Hidetaka Asano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 770 days.

(21) Appl. No.: 17/460,484

(22) Filed: Aug. 30, 2021

(65) Prior Publication Data

US 2022/0105541 A1    Apr. 7, 2022

(30) Foreign Application Priority Data

Oct. 2, 2020 (JP) ................. 2020-167786

(51) Int. Cl.
*B05D 7/14* (2006.01)
*C09D 5/20* (2006.01)

(52) U.S. Cl.
CPC ................. *B05D 7/14* (2013.01); *C09D 5/20* (2013.01)

(58) Field of Classification Search
CPC ............... C09D 5/20; Y10T 428/24273; Y10T 428/24479; Y10T 428/24521; Y10T 428/24529; Y10T 428/24537; Y10T 428/2457; Y10T 428/24777; B05D 7/14
See application file for complete search history.

(56) References Cited

U.S. PATENT DOCUMENTS

| | | | | |
|---|---|---|---|---|
| 4,942,193 A | * | 7/1990 | Van Buskirk | C10M 173/02 524/277 |
| 2010/0167075 A1 | * | 7/2010 | Mesa | C09D 5/20 428/524 |

(Continued)

FOREIGN PATENT DOCUMENTS

| JP | H06142604 A | 5/1994 |
|---|---|---|
| JP | H0780400 A | 3/1995 |

(Continued)

OTHER PUBLICATIONS

Ito (JP 2011-136604 A); Jul. 14, 2011 (EPO machine translation to English). (Year: 2011).*

(Continued)

*Primary Examiner* — Donald M Flores, Jr.
(74) *Attorney, Agent, or Firm* — Dickinson Wright, PLLC (57) ABSTRACT

A vehicle structure capable of obtaining both the adhesive property and stripping performance of a coating. The vehicle structure includes an outer panel and an exterior component, and a coating formed by applying easily strippable coating material onto the outer panel and exterior component. The coating includes a design portion formed on the outer surface of the outer panel and exterior component, and a non-design portion coupled to the design portion and formed on the side end surface and backside surface of the outer panel and exterior component. At least one start point for stripping the coating is provided in at least one of the non-design portion of the coating, or the side end surface or backside surface of the outer panel and exterior component.

7 Claims, 10 Drawing Sheets

(56) References Cited

U.S. PATENT DOCUMENTS

| | | | |
|---|---|---|---|
| 2015/0273496 A1* | 10/2015 | Shinoda | B05B 1/3405 118/631 |
| 2021/0387230 A1 | 12/2021 | Fujioka | |
| 2022/0089884 A1* | 3/2022 | Fujioka | B05D 3/12 |

FOREIGN PATENT DOCUMENTS

| | | | | |
|---|---|---|---|---|
| JP | 07328528 | A | * | 12/1995 |
| JP | H07328528 | A | | 12/1995 |
| JP | 2004314025 | A | * | 11/2004 |
| JP | 2011136604 | A | * | 7/2011 |
| JP | 2014057948 | A | | 4/2014 |
| WO | 2020/138061 | A1 | | 7/2020 |
| WO | 2020/138064 | A1 | | 7/2020 |

OTHER PUBLICATIONS

Arakawa et al. (JP H07-328528 A); Dec. 19, 1995 (EPO machine translation to English). (Year: 1995).*

CK Wraps, "Use This Technique | Wrap A Front Bumper In One Piece", YouTube, Sep. 27, 2018; < https://www.youtube.com/watch?v=kmh_lalofhw>. (Year: 2018).*

CK Wraps, "Detailed! How-To Gas Lid Door Workaround—Fender Wrap", YouTube, May 17, 2019; <https://www.youtube.com/watch?v=NdJ8IKYOU4I>. (Year: 2019).*

Oyanagi (JP 2004-314025 A), Nov. 11, 2004 (EPO machine translation to English). (Year: 2004).*

"Groove"; The Free Dictionary (accessed Oct. 30, 2024); <https://www.thefreedictionary.com/groove>. (Year: 2024).*

"Notch"; The Free Dictionary (accessed Oct. 30, 2024); <https://www.thefreedictionary.com/notch>. (Year: 2024).*

* cited by examiner

VEHICLE STRUCTURE

CROSS REFERENCE TO RELATED APPLICATIONS

The present application claims priority from Japanese patent application JP 2020-167786 filed on Oct. 2, 2020, the entire content of which is hereby incorporated by reference into this application.

BACKGROUND

Technical Field

The present disclosure relates to a vehicle structure, and in particular, a vehicle structure including a strippable coating formed through application of easily strippable coating material.

Background Art

For example, JP H06-142604 A discloses a technique of temporarily protecting the painted surface of a painted vehicle during transportation, by forming an easily strippable coating on the painted surface and then stripping it after transportation. The coating includes layers obtained through application of strippable paint using a roller and by spraying.

SUMMARY

The coating of the aforementioned technique is formed of coating layers. However, obtaining both the adhesive property and stripping performance in the coating formed of coating layers is difficult. In other words, the coating is required not to be easily stripped in normal use and to be easily stripped when necessary, but the aforementioned technique could not deal with such an issue.

The present disclosure has been made in view of the aforementioned technical issue, and provides a vehicle structure capable of obtaining both the adhesive property and stripping performance of a coating.

The vehicle structure according to the present disclosure includes an outer panel and an exterior component of a vehicle, and a strippable coating formed by applying easily strippable coating material onto the outer panel and the exterior component, in which the coating has a design portion formed on an outer surface of each of the outer panel and the exterior component, and a non-design portion coupled to the design portion and formed on a side end surface and a backside surface of each of the outer panel and the exterior component, and at least one start point for stripping the coating is provided in at least one of the non-design portion of the coating, or the side end surface or the backside surface of each of the outer panel and the exterior component.

In the vehicle structure according to the present disclosure, the coating is formed by applying easily strippable coating material onto the outer panel and exterior component of the vehicle, so that the adhesion between the coating and the outer panel and exterior component of the vehicle can be easily maintained. In addition, since the start point for stripping the coating is provided in at least one of the non-design portion of the coating, or the side end surface or backside surface of each of the outer panel and the exterior component, the coating can be easily stripped utilizing the start point for stripping. Therefore, the coating that is not easily stripped in normal use and is easily stripped when necessary can be realized, thereby enabling both the adhesive property and stripping performance of the coating to be obtained.

In the vehicle structure according to the present disclosure, the start point for stripping may be a notch formed in the non-design portion of the coating in some embodiments. This facilitates the stripping of the coating from the notch as a start point for stripping.

In the vehicle structure according to the present disclosure, the start point for stripping may be formed in the non-design portion of the coating and be thicker than the design portion in some embodiments. Since stripping becomes easier as the thickness is increased, the coating can be easily stripped from the start point for stripping that is relatively thick.

Further, in the vehicle structure according to the present disclosure, the start point for stripping may be formed in the non-design portion of the coating and chemically treated so as to have a weaker adhesive property as compared to the adhesion between the design portion and each of the outer panel and the exterior component, in some embodiments. This facilitates stripping of the coating from the start point for stripping having a relatively weak adhesive property.

Furthermore, in the vehicle structure according to the present disclosure, the start point for stripping may be a recessed and projected portion or a stepped portion formed on the backside surface of each of the outer panel and the exterior component in some embodiments. The coating formed in the recessed and projected portion or the stepped portion is relatively easily stripped as compared to that formed in the other sites. Thus, the coating can be easily stripped using the portion as the start point for stripping.

In addition, in the vehicle structure according to the present disclosure, in some embodiments, the start point for stripping may be formed on the backside surface of each of the outer panel and the exterior component and made of a material having a weaker adhesive property as compared to the adhesion between the design portion and each of the outer panel and the exterior component. This facilitates the stripping of the coating from the start point for stripping made of the material having a relatively weak adhesive property.

Further, in the vehicle structure according to the present disclosure, the start point for stripping may be pressed by an attachment component attached to the outer panel in some embodiments. In this manner, the start point for stripping is pressed with the pressing force of the attachment component, so that the adhesive property of the coating can be enhanced.

Furthermore, in the vehicle structure according to the present disclosure, in some embodiments, the start point for stripping may be provided between the outer panels assembled, between the exterior components assembled, or between the outer panels and the exterior components that are assembled. The assembled outer panels, exterior components, or outer panels and exterior components have force pressing against each other. Thus, such a pressing force is utilized to press the start point for stripping so that the adhesive property of the coating can be enhanced.

According to the present disclosure, both the adhesive property and stripping performance of the coating can be obtained.

DETAILED DESCRIPTION

With reference to the drawings, an embodiment of a vehicle structure according to the present disclosure will be described below. The vehicle referred to in the present embodiment includes automobiles and trains. Herein, a passenger car of the automobiles will be described as an example.

Figure 1:
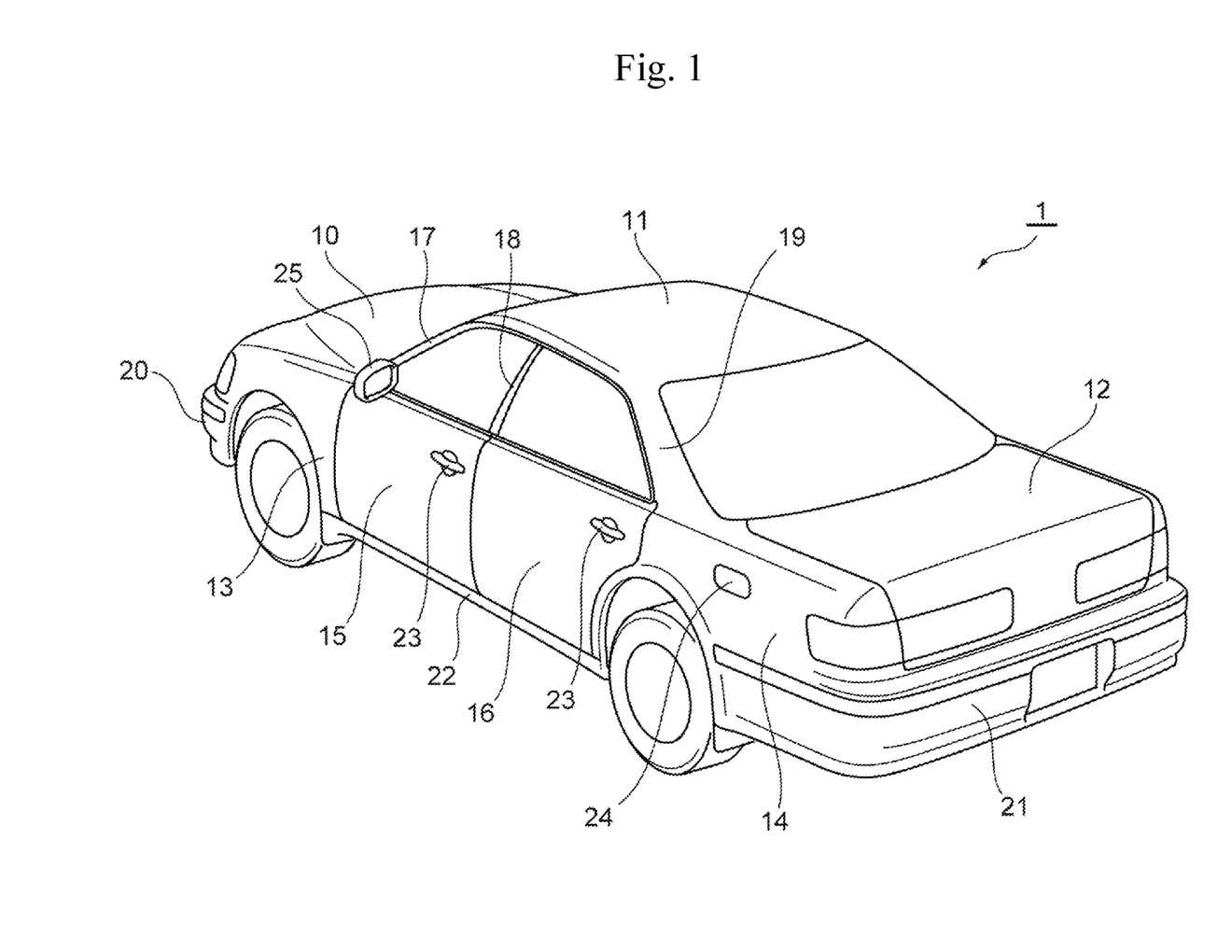
FIG. 1 is a perspective view showing a vehicle structure according to an embodiment.

FIG. 1 is a perspective view showing a vehicle structure according to the embodiment. As shown in FIG. 1, a vehicle 1 includes a plurality of outer panels and exterior components. The outer panels herein are externally visible members (in other words, visible from the outside of the vehicle) constituting the vehicle body. Examples of the outer panel include a hood panel 10, a roof panel 11, a trunk lid 12, a front fender panel 13, a rear fender panel 14, a front door outer 15, a rear door outer 16, a front pillar 17, a center pillar 18, and a rear pillar 19. The examples of the material adopted for the outer panels include hot-rolled sheet steel or cold-rolled sheet steel.

Meanwhile, the exterior components of the vehicle 1 are externally visible fittings to be assembled into the vehicle body. Examples of the exterior component include a front bumper cover 20, a rear bumper cover 21, a rocker panel molding 22, a door handle 23, a fuel filler cover 24, a side-view mirror 25, a shark fin (not shown), and a roof molding (not shown). The material mainly adopted for the exterior components is resin, but the fuel filler cover 24 is mostly formed of sheet steel.

A strippable coating 30 is formed on the aforementioned outer panels and exterior components. More specifically, the strippable coating 30 formed by applying easily strippable coating material is provided on the outer surface and side end surface and also a part of the backside surface of each of these outer panels and exterior components. The coating 30 is formed by applying easily strippable coating material onto the outer panels and exterior components of the vehicle 1 in this manner, so that the adhesion between the coating 30 and the outer panels and exterior components of the vehicle 1 can be easily maintained.

Figure 2:
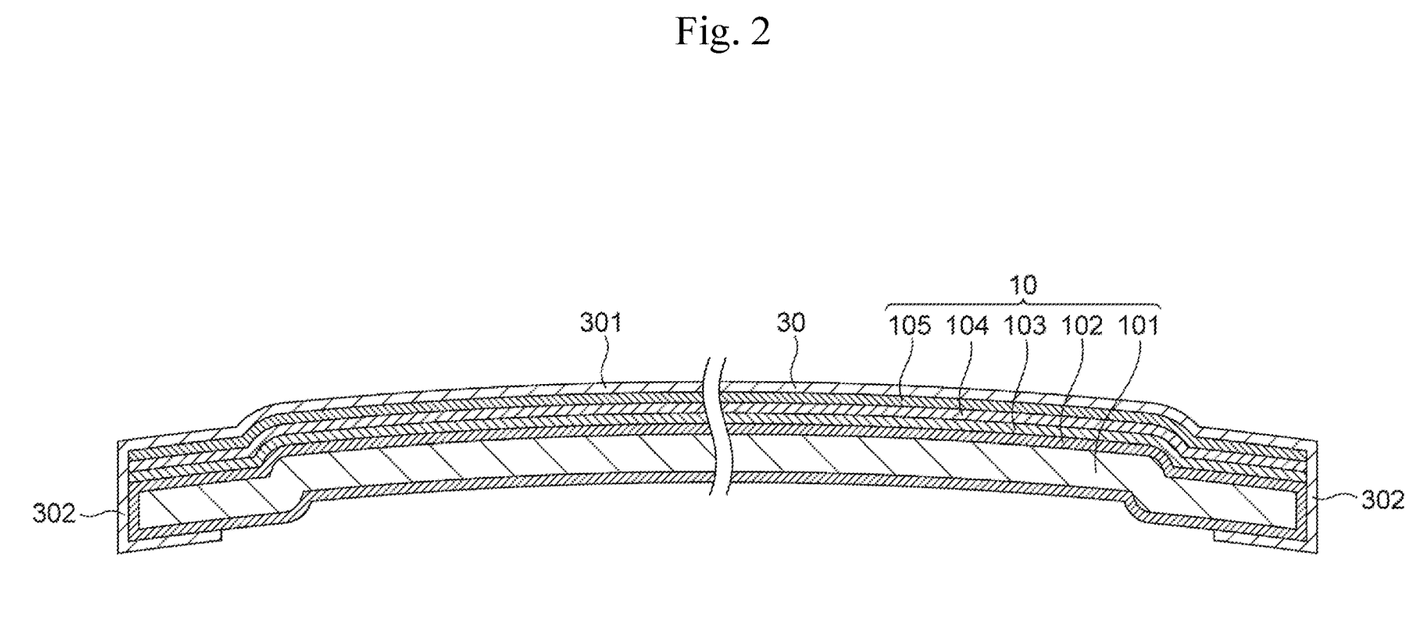
FIG. 2 is a schematic cross-sectional view showing a hood panel and a coating formed on the hood panel.
Figure 3A:
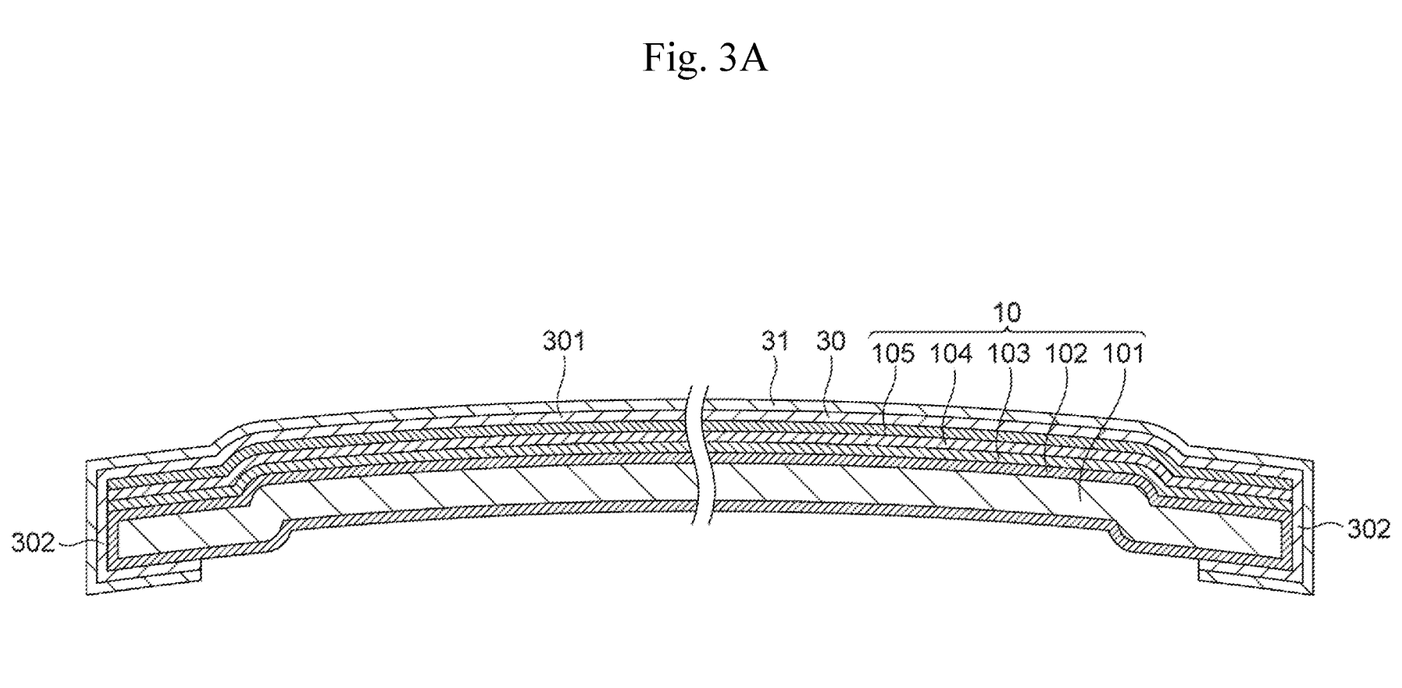
FIG. 3A is a schematic cross-sectional view showing an example of the coating with a clear layer formed on the outer side of the coating.
Figure 3B:
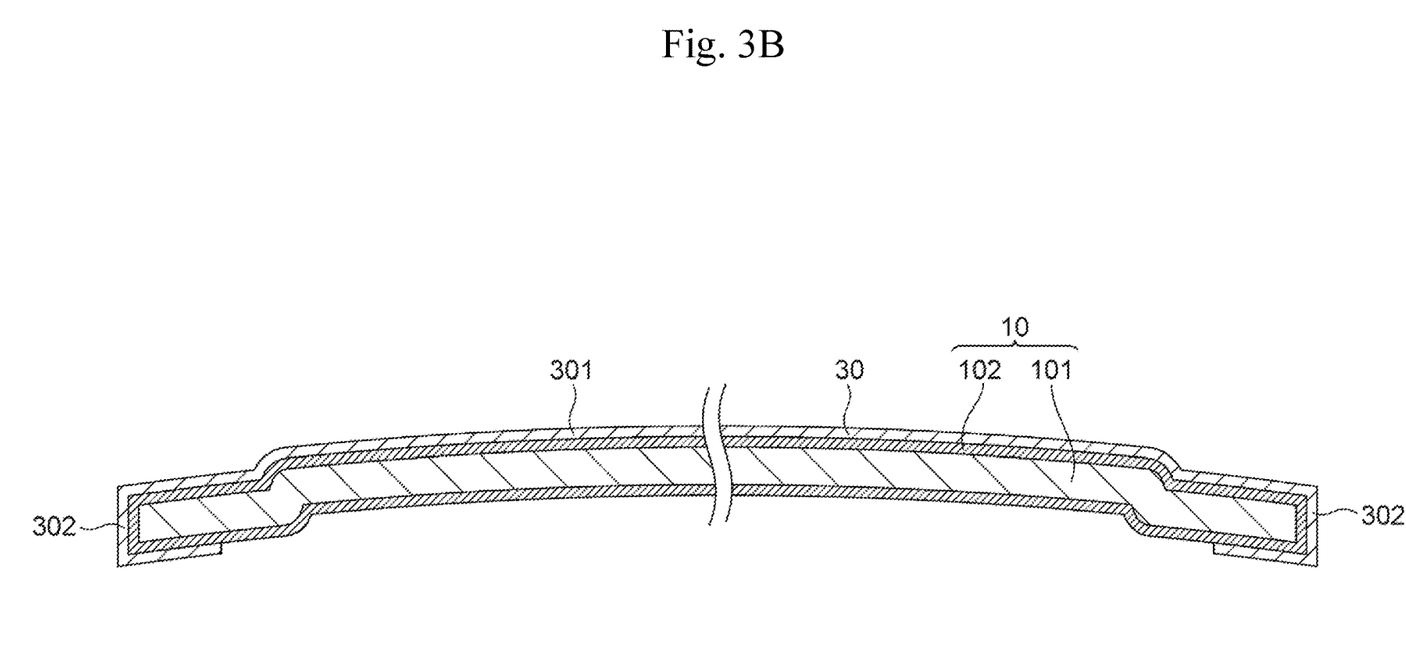
FIG. 3B is a schematic cross-sectional view showing an example of the coating directly formed on an electrodeposited layer.
Figure 3C:
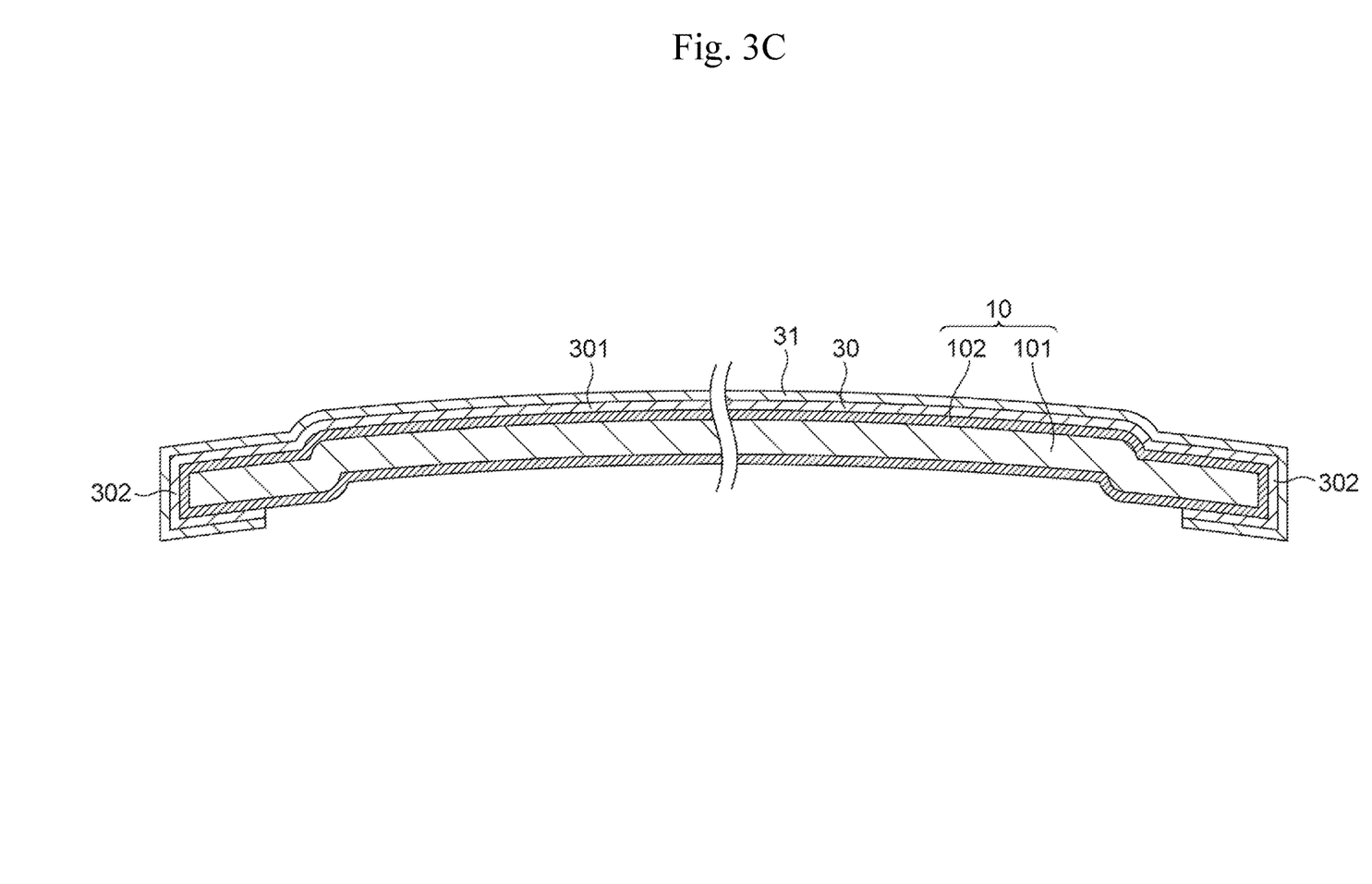
FIG. 3C is a schematic cross-sectional view showing an example of the coating formed on the electrodeposited layer, with the clear layer further formed on the outer side of the coating.
Figure 4:
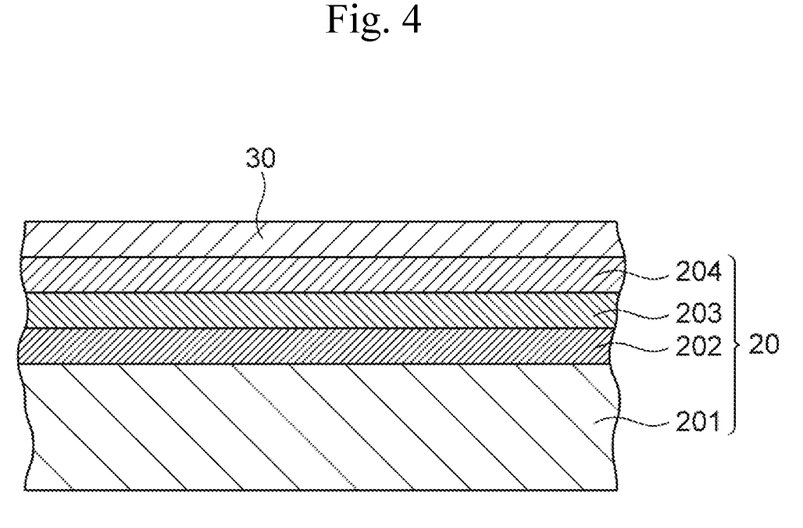
FIG. 4 is a schematic cross-sectional view showing a front bumper cover and the coating formed on the front bumper cover.

With reference to FIG. 2 to FIG. 4, the coating 30 formed on the outer panel and exterior component will be described below. First, the coating 30 formed on the outer panel will be described by presenting an example of the hood panel 10.

FIG. 2 is a schematic cross-sectional view showing a hood panel and a coating formed on the hood panel. In FIG. 2, the upper side in the drawing is the front side (also referred to as the outer side) of the hood panel 10 and the lower side is the back side (also referred to as the inner side) of the hood panel 10. As shown in FIG. 2, the hood panel 10 includes a sheet steel 101, an electrodeposited layer 102 formed so as to cover the entire sheet steel 101, and an intermediate coating layer 103, a base layer 104, and a clear layer 105 that are formed in this order on the electrodeposited layer 102 on the front side of the hood panel 10.

Further, the coating 30 is formed on the entire outer surface and side end surface and on a part of the backside surface of the hood panel 10. The coating 30 is formed by applying easily strippable coating material as described above, thus having an easily strippable property as compared to the typical coating including the electrodeposited layer 102, the intermediate coating layer 103, the base layer 104, and the clear layer 105.

In addition, the coating 30 includes a design portion 301 formed on the outer surface of the hood panel 10, and a non-design portion 302 coupled to the design portion 301 and formed on the entire side end surface and on a part of the backside surface of the hood panel 10. That is, when the hood panel 10 is mounted on the vehicle 1, the design portion 301 is an externally visible portion of the coating 30, and the non-design portion 302 is an externally invisible portion of the coating 30. It should be noted that the side end surface of the hood panel 10 refers to the peripheral end face extending in the longitudinal and lateral directions of the vehicle 1.

The coating 30 is formed by, for example, spraying easily strippable coating material onto the hood panel 10. Examples of the easily strippable coating material include coating materials made from xylene, ethylbenzene, an antioxidant, methyl ethyl ketone, a silica reactant, a titanium oxide (nanoparticles), and an organic solvent.

It should be noted that a clear layer 31 may be further formed on the outer side of the coating 30 (see FIG. 3A). With the clear layer 31 formed as such, the weather resistance and chemical resistance of the coating 30 can be enhanced, and the sleek and luxurious appearance can also be further distinguished.

The hood panel 10 does not necessarily include the sheet steel 101, the electrodeposited layer 102, the intermediate coating layer 103, the base layer 104, and the clear layer 105, but may only include the sheet steel 101 and the electrodeposited layer 102, for example, as shown in FIG. 3B. In this case, the coating 30 is formed directly on the electrodeposited layer 102. Further, in this case also, the clear layer 31 may be further formed on the outer side of the coating 30 (see FIG. 3C).

The coating 30 provided on the outer panel has been described above by presenting the example of the hood panel 10. The description similarly applies to the other outer panels, such as the roof panel 11, trunk lid 12, front fender panel 13, rear fender panel 14, front door outer 15, rear door outer 16, front pillar 17, center pillar 18, and rear pillar 19. Thus, the overlapping description will be omitted.

Next, the coating 30 formed on the exterior component will be described by presenting an example of the front bumper cover 20.

FIG. 4 is a schematic cross-sectional view showing a front bumper cover and the coating formed on the front bumper cover. In FIG. 4, the upper side in the drawing is the front side (also referred to as the outer side) of the front bumper cover 20 and the lower side is the back side (also referred to as the inner side) of the front bumper cover 20. The front bumper cover 20 includes a resin member 201 integrally molded in a bumper form, and a primer layer 202, a base layer 203, and a clear layer 204 that are formed in this order on the resin member 201. Further, the coating 30 is formed on the entire outer surface and side end surface and on a part of the backside surface of the front bumper cover 20. It should be noted that the aforementioned clear layer 31 may be further formed on the outer side of the coating 30.

Further, the coating 30 is similarly formed on the exterior components made of resin, such as the rear bumper cover 21, rocker panel molding 22, and door handle 23 as well as the front bumper cover 20. Thus, the overlapping description will be omitted. It should be noted that when the fuel filler cover 24 is formed of sheet steel, the coating 30 is formed thereon similarly to the aforementioned hood panel 10.

In the present embodiment, at least one start point 40 for stripping the coating 30 is provided in at least one of the non-design portion 302 of the coating 30, or the side end surface or backside surface of each of the outer panel and exterior component. With the start point 40 for stripping provided as such, the coating 30 can be easily stripped from the start point 40 for stripping when stripping is required.

Various forms of the start point 40 for stripping can be considered. The forms mainly include a form obtained by devising the coating 30, a form obtained by devising the outer panel and exterior component, and a form obtained by devising both the coating, and the outer panel and exterior component.

First, the form of the start point 40 for stripping obtained by devising the coating 30 will be described.

Figure 5:
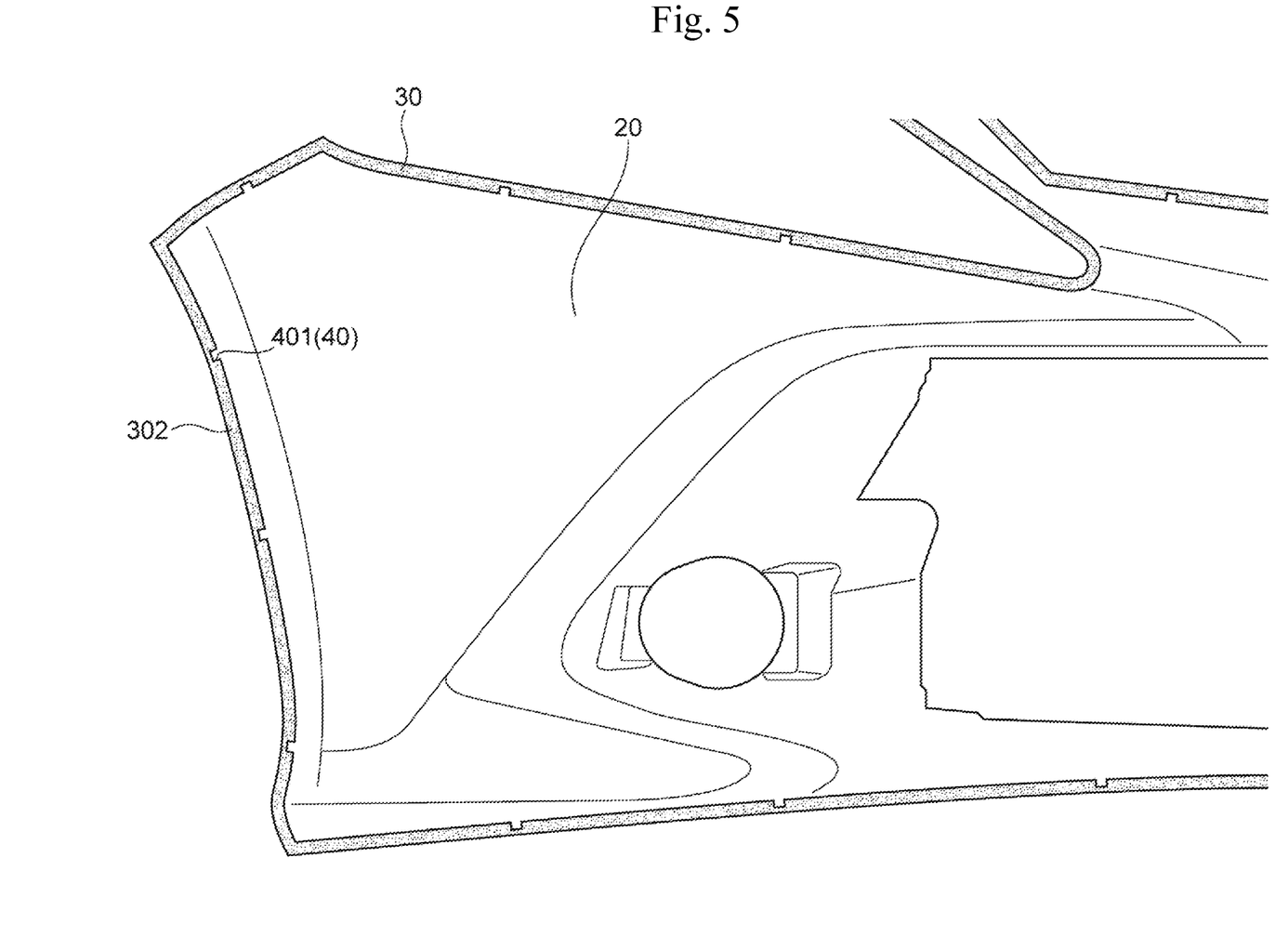
FIG. 5 is a schematic view showing an example of forming a start point for stripping on a backside surface of the front bumper cover.

FIG. 5 is a schematic view showing an example of forming the start point for stripping on the backside surface of the front bumper cover. FIG. 5 depicts the coating 30 with a dotted pattern for easy recognition. As shown in FIG. 5, the non-design portion 302 of the coating 30 is formed on the backside surface of the front bumper cover 20 and is provided with a plurality of notches 401. These notches 401 form the start point 40 for stripping, and are formed by cutting out portions in a rectangular shape from the non-design portion 302 using a cutter or the like. This enables the coating 30 to be easily stripped from these notches 401 as the start point for stripping when the stripping of the coating 30 is required.

The length, width, and depth of each notch 401 are determined considering the size of the front bumper cover 20, the stripping performance of the coating 30, and the like. Further, these notches 401 are arranged at a predetermined interval along the circumferential direction of the front bumper cover 20. The interval at which the notches 401 are arranged is set considering the size of the front bumper cover 20, the stripping performance of the coating 30, and the like, and the notches 401 are not necessarily arranged equidistantly. Further, each notch 401 may be in a rectangular, wave-like, or saw-like shape, or the like.

Further, the start point 40 for stripping may be formed in the non-design portion 302 of the coating 30 and be thicker than the design portion 301. For example, in spray application, easily strippable coating material is sprayed onto the site where the start point 40 for stripping is to be formed more times than the other sites, so as to thicken the start point 40 for stripping. In this manner, since stripping becomes easier as the thickness is increased, the coating 30 can be easily stripped from the start point 40 for stripping that is relatively thick.

Furthermore, the start point 40 for stripping may be formed in the non-design portion 302 of the coating 30 and chemically treated so as to have a weaker adhesive property as compared to the adhesion between the design portion 301 and each of the outer panel and exterior component. More specifically, a mold release agent, for example, is further applied onto the edge portion of the non-design portion 302 so as to weaken the adhesion between the non-design portion 302 and each of the outer panel and exterior component as compared to that between the design portion 301 and each of the outer panel and exterior component. This enables the coating 30 to be easily stripped from the start point 40 for stripping having a relatively weak adhesive property. It should be noted that the chemical treatment may employ agents other than the mold release agent.

Next, the form of the start point 40 for stripping obtained by devising the outer panel and exterior component will be described.

Figure 6A:
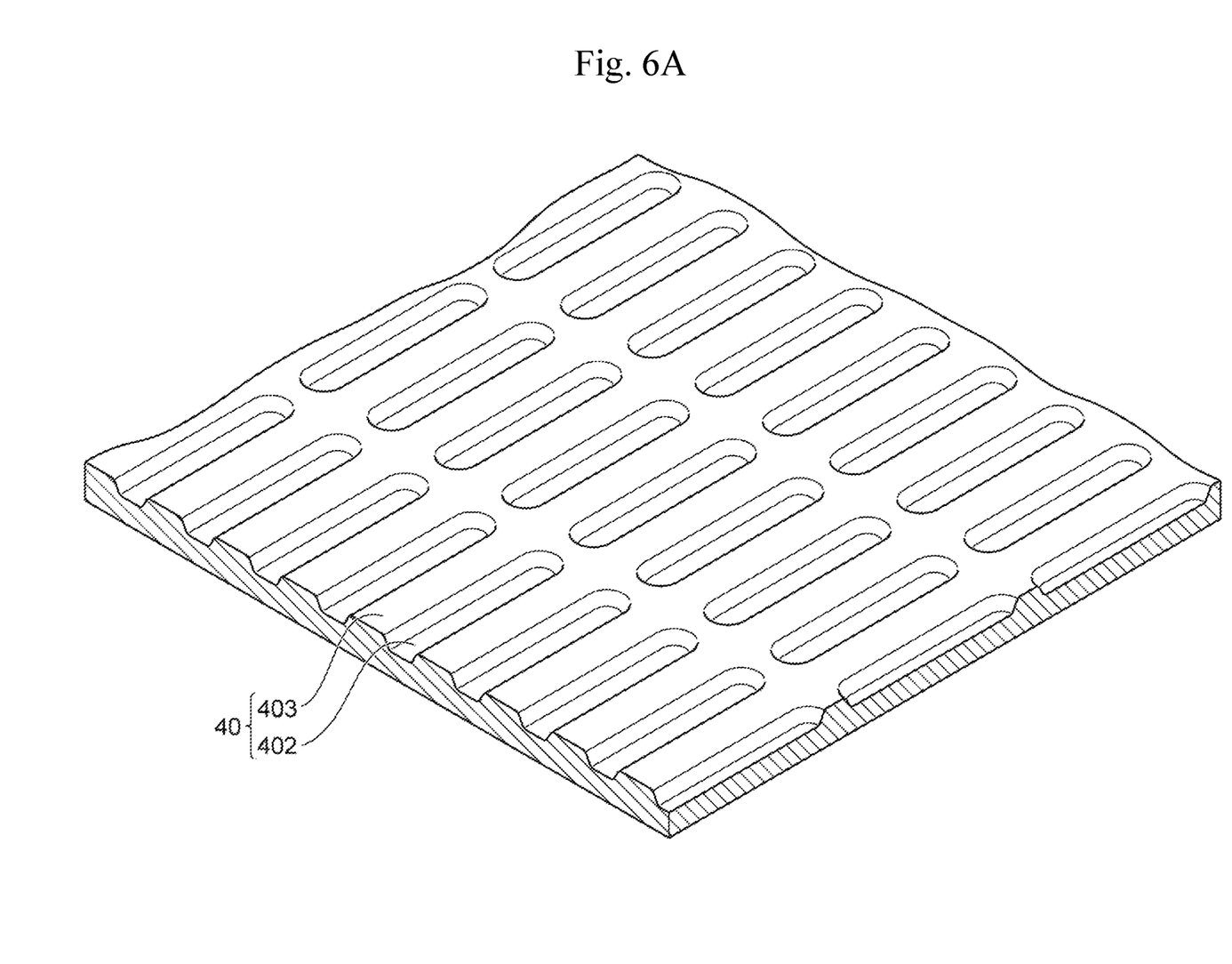
FIG. 6A is an image view of the start point for stripping formed as a recessed and projected portion.
Figure 6B:
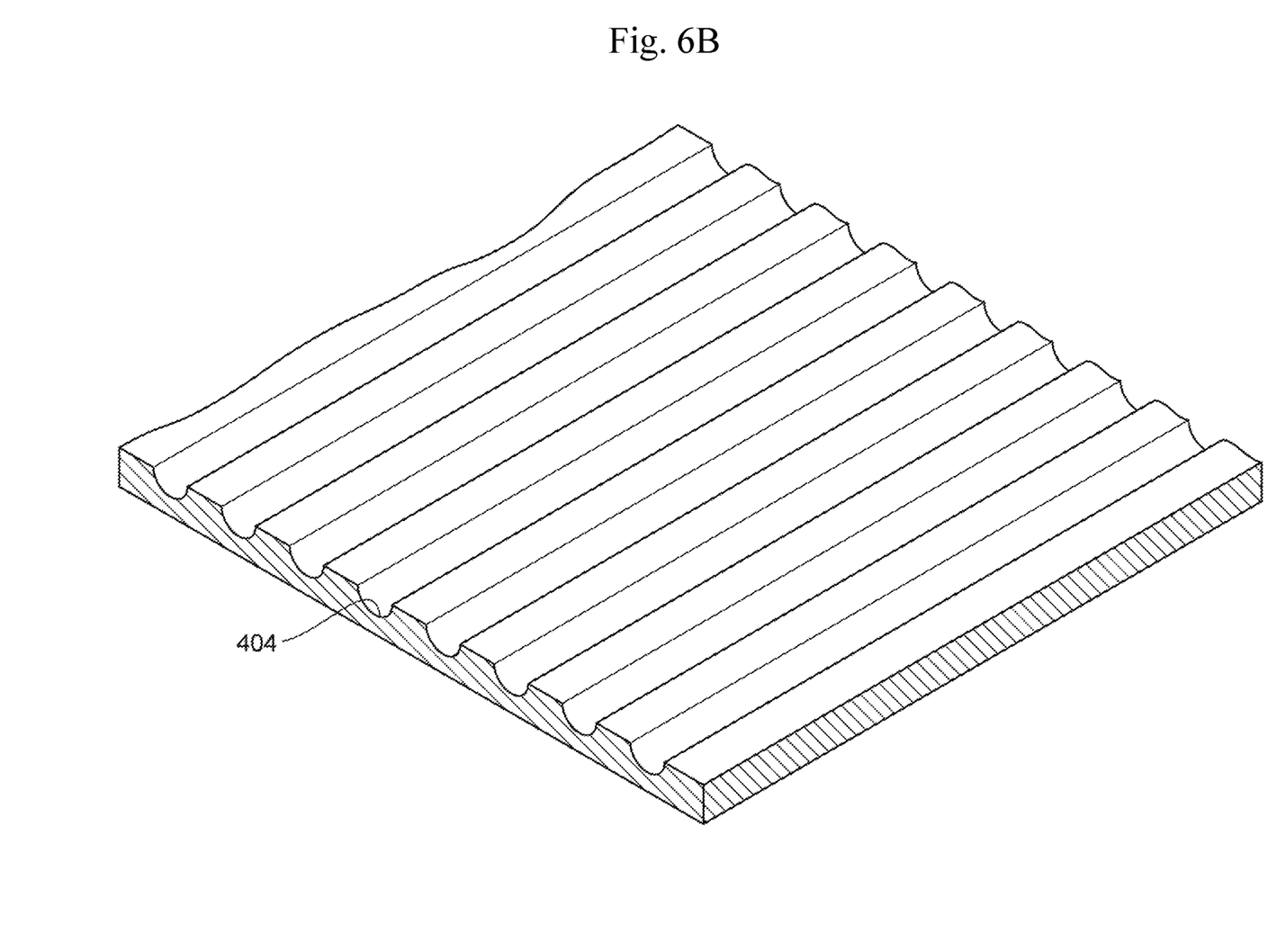
FIG. 6B is an image view of the start point for stripping formed as the recessed and projected portion.
Figure 6C:
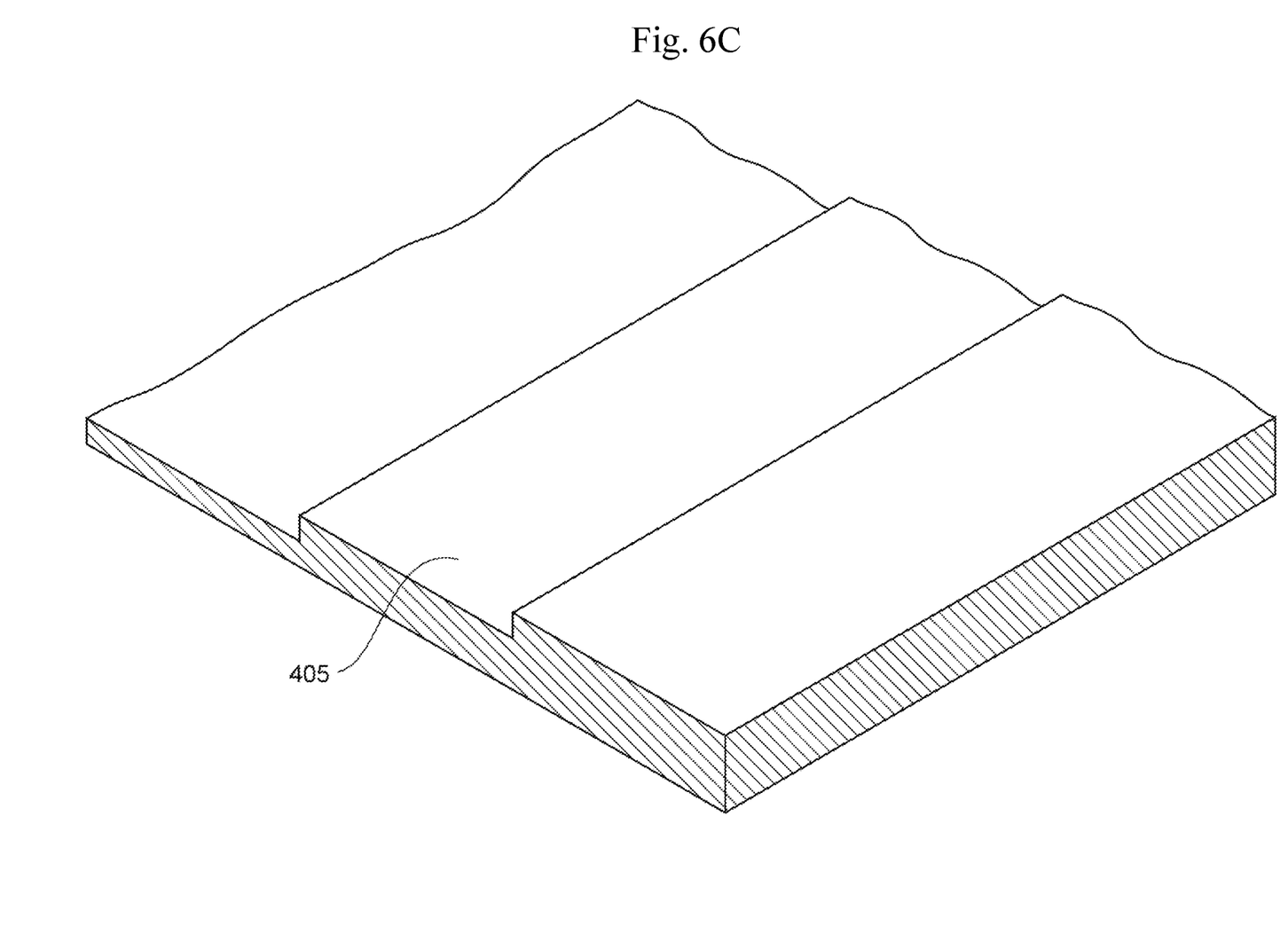
FIG. 6C is an image view of the start point for stripping formed as a stepped portion.

As shown in FIG. 6A, for example, the start point 40 for stripping is a recessed and projected portion formed in a part of the backside surface of each of the outer panel and exterior component. The recessed and projected portion has a plurality of recesses 402 and projections 403 that are alternately arranged. Further, the recessed and projected portion may be formed of a plurality of groove portions 404 equidistantly arranged as shown in FIG. 6B, for example. Further, as shown in FIG. 6C, the start point 40 for stripping may be a stepped portion 405 formed on a part of the backside surface of each of the outer panel and exterior component. This enables the coating formed in the recessed and projected portion or the stepped portion to be relatively easily stripped as compared to the coating formed in the other sites. Thus, the coating 30 can be easily striped from the portion as the start point for stripping.

Moreover, the start point 40 for stripping may be formed on the backside surface of each of the outer panel and exterior component and made of a material having a weaker adhesive property as compared to the adhesion between the design portion 301 and each of the outer panel and exterior component. More specifically, a portion of each of the outer panel and exterior component where the start point 40 for stripping is to be formed is made of a material having a relatively weak adhesive property, such as a PP (polypropylene) resin, an ABS (acrylonitrile-butadiene-styrene) resin, a PC (polycarbonate) resin, fabric, wood, and rubber. In particular, fabric, wood, and rubber absorb the coating material, and thus are capable of weakening the adhesion between the non-design portion and each of the outer panel and exterior component. In this manner, the coating 30 can be easily stripped from the start point 40 for stripping made of a material having a relatively weak adhesive property.

It should be noted that the form of the start point 40 for stripping obtained by devising both the coating, and the outer panel and exterior component is a combination of the form obtained by devising the coating 30 and the form obtained by devising the outer panel and exterior component, which are described above. Thus, the detailed description will be omitted.

Further, in some embodiments, the start point 40 for stripping may be pressed by an attachment component attached to the outer panel. For example, the start point 40 for stripping of the coating 30 formed on the hood panel 10 is disposed under a headlight (attachment component) attached to the hood panel 10. In this manner, the start point 40 for stripping is pressed with the pressing force of the headlight, so that the adhesive property of the coating 30 can be enhanced. Then, when the coating 30 formed on the hood panel 10 needs to be stripped, the headlight is first removed, and then the coating 30 may be stripped from the start point 40 for stripping.

The examples of the attachment component include a headlight washer nozzle, a tail light, a clearance sonar, and the like, as well as a headlight.

Furthermore, the start point 40 for stripping may be provided between the assembled outer panels, between the assembled exterior components, or between the assembled outer panels and exterior components. For example, the start point 40 for stripping of the coating 30 formed on the rear fender panel 14 is provided between the rear fender panel 14 and the fuel filler cover 24 so as to be pressed by the fuel filler cover 24 assembled with the rear fender panel 14. In this manner, the pressing forces of the rear fender panel 14 and the fuel filler cover 24 assembled together act against each other and are utilized to press the start point 40 for stripping, so that the adhesive property of the coating 30 can be enhanced. Further, when the coating 30 formed on the rear fender panel 14 needs to be stripped, the coating 30 may be stripped from the start point 40 for stripping with the fuel filler cover 24 opened.

According to the structure of the vehicle 1 of the present embodiment, the coating 30 that is not easily stripped in normal use and is easily stripped when stripping is required can be realized, so that both the adhesive property and stripping performance of the coating 30 can be obtained.

Although the embodiment of the present disclosure has been described in detail, the present disclosure is not limited thereto, and any design changes can be made without departing from the spirit of the present disclosure described in the scope of the claims.

What is claimed is:

1. A vehicle structure comprising:
an outer panel and an exterior component of a vehicle; and
a strippable coating formed by applying strippable coating material onto the outer panel and the exterior component,
wherein:
the coating has a design portion formed on an outer surface of each of the outer panel and the exterior component, and a non-design portion coupled to the design portion and formed on a side end surface and a backside surface of each of the outer panel and the exterior component, and
at least one start point for stripping the coating is provided in at least one of the non-design portion of the coating, or the side end surface or the backside surface of each of the outer panel and the exterior component;
wherein one start point of the at least one start point for stripping is a recessed and projected portion formed on the backside surface of each of the outer panel and the exterior component; and
wherein the recessed and projected portion has a plurality of recesses and projections that are alternately arranged.

2. The vehicle structure according to claim 1, wherein another start point of the at least one start point for stripping is a cut out portion formed in the non-design portion of the coating.

3. The vehicle structure according to claim 1, wherein another start point of the at least one start point for stripping is formed in the non-design portion of the coating and is thicker than the design portion.

4. The vehicle structure according to claim 1, wherein another start point of the at least one start point for stripping is formed in the non-design portion of the coating and chemically treated so as to have a weaker adhesive property as compared to the adhesion between the design portion and each of the outer panel and the exterior component.

5. The vehicle structure according to claim 1, wherein another start point of the at least one start point for stripping is formed on the backside surface of each of the outer panel and the exterior component and made of a material having a weaker adhesive property as compared to the adhesion between the design portion and each of the outer panel and the exterior component.

6. The vehicle structure according to claim 1, wherein the one start point of the at least one start point for stripping is pressed by an attachment component attached to the outer panel.

7. The vehicle structure according to claim 1, wherein the one start point of the at least one start point for stripping is provided between two outer panels assembled on the vehicle, between two exterior components assembled on the vehicle, or between the outer panel and the exterior component that are assembled on the vehicle.

* * * * *